US012562487B2

(12) United States Patent
Yang et al.

(10) Patent No.: US 12,562,487 B2
(45) Date of Patent: Feb. 24, 2026

(54) MILLIMETER-WAVE BROADBAND SUBSTRATE INTEGRATED HYBRID DIELECTRIC RESONATOR ANTENNA

(71) Applicant: Nantong University, Nantong (CN)

(72) Inventors: Wenwen Yang, Nantong (CN); Jieer Zhang, Nantong (CN); Qinfang Zhang, Yancheng (CN); Jianxin Chen, Nantong (CN)

(73) Assignee: Nantong University, Nantong (CN)

( * ) Notice: Subject to any disclaimer, the term of this patent is extended or adjusted under 35 U.S.C. 154(b) by 318 days.

(21) Appl. No.: 18/310,244

(22) Filed: May 1, 2023

(65) Prior Publication Data

US 2024/0195073 A1 Jun. 13, 2024

Related U.S. Application Data

(63) Continuation of application No. PCT/CN2022/139872, filed on Dec. 19, 2022.

(30) Foreign Application Priority Data

Dec. 13, 2022 (CN) ......................... 202211601971.2

(51) Int. Cl.

*H01Q 9/04* (2006.01)
*H01Q 5/357* (2015.01)
*H01Q 13/10* (2006.01)

(52) U.S. Cl.

CPC ........... *H01Q 9/0485* (2013.01); *H01Q 5/357* (2015.01); *H01Q 13/106* (2013.01)

(58) Field of Classification Search

CPC ......... H01Q 5/357; H01Q 9/0485–065; H01Q 13/106

See application file for complete search history.

(56) References Cited

U.S. PATENT DOCUMENTS 5,517,203 A * 5/1996 Fiedziuszko ........... H01Q 19/17 343/756
8,928,544 B2 * 1/2015 Massie ................... H01Q 1/243 343/769
2024/0063546 A1 * 2/2024 Leung .................... H01Q 3/247

FOREIGN PATENT DOCUMENTS

CN 113036438 A * 6/2021 ............. H01Q 1/002
CN 113410631 A * 9/2021

OTHER PUBLICATIONS

English Translation of CN113036438A (Year: 2021).*
English Translation of CN113410631A (Year: 2021)*

* cited by examiner

*Primary Examiner* — Amal Patel
(74) *Attorney, Agent, or Firm* — Hemisphere Law, PLLC; Zhigang Ma

(57) ABSTRACT

A millimeter-wave broadband substrate integrated hybrid dielectric resonator antenna is provided. The hybrid antenna includes: a first dielectric substrate with high dielectric constant, a second dielectric substrate with low dielectric constant, and a third dielectric substrate with low dielectric constant sequentially stacked from top to bottom. The first dielectric substrate and the second dielectric substrate are adhered by a first adhesive sheet; the second dielectric substrate and the third dielectric substrate are adhered by a second adhesive sheet; a middle of a top surface of the second dielectric substrate is printed with a metal ring patch; a top surface of the third dielectric substrate is formed with a metal ground plane, and the metal ground plane is etched with a feed slot; and a bottom surface of the third dielectric substrate is disposed with a microstrip line.

8 Claims, 5 Drawing Sheets

MILLIMETER-WAVE BROADBAND SUBSTRATE INTEGRATED HYBRID DIELECTRIC RESONATOR ANTENNA

TECHNICAL FIELD

The disclosure relates to the technical field of millimeter-wave antenna design, in particular to a millimeter-wave broadband substrate integrated hybrid dielectric resonator antenna.

BACKGROUND

There are two difficulties in the design of terminal millimeter-wave antennas. On one hand, the authorized 5th generation mobile communication technology (5G) millimeter-wave bands (also referred to as millimeter-wave frequency bands) worldwide include n257 (26.5 gigahertz (GHz)-29.5 GHZ), n258 (24.25 GHz-27.5 GHZ), n260 (37.0 GHz-40.0 GHZ) and n261 (27.5 GHZ 28.35 GHZ), and a terminal millimeter-wave antenna needs to fully cover the above millimeter-wave bands. On the other hand, the terminal millimeter-wave antenna needs to be realized in a form of phased beam scanning array, with its high gain to make up for shortcomings of high transmission loss in the millimeter-wave bands, and with its wide-angle beam scanning capability to achieve the wide-angle coverage. However, in order to achieve the effect of wide-angle beam scanning and avoid problems such as grid lobe, a spacing between antennas in an array should be kept at about $0.5\lambda_0$, which requires that a plane size of an antenna unit should be at least less than $0.4\times0.4\lambda_0^2$. Therefore, in the technical field of terminal millimeter-wave antennas, it is of great significance and application value to design an antenna with full-band coverage (a range of 24.25 GHz to 40 GHz) and a small size (that is, $<0.4\times0.4\lambda_0^2$).

In the existing millimeter-wave antenna designs, most of antennas with broadband designs cannot meet the requirement of small size. Although some antennas, such as electromagnetic dipole antenna and laminated patch antenna, can achieve full coverage of target frequency bands with a small plane size, each of radiation bodies of these antennas is a metal structure, and ohmic loss of the metal structure in the millimeter-wave frequency bands will significantly increase, which will lead to a rapid reduction in radiation efficiency. Compared with a metal antenna, a dielectric resonator antenna has no metal ohm loss, and the dielectric resonator antenna has higher radiation efficiency and can effectively solve the problem of low radiation efficiency. It is an excellent solution for millimeter-wave antennas and terahertz antennas. However, the existing broadband dielectric resonator antenna cannot meet the requirement of small size, while the dielectric resonator antenna that meets the requirement of small size has narrow bandwidth coverage and cannot achieve the full-band coverage of the 5G millimeter-wave bands. In addition to the narrow bandwidth, most of the existing dielectric resonator antennas use separately processed ceramic dielectrics as the radiation body, which makes the processing and assembly of the existing dielectric resonator antennas be complex.

The existing millimeter-wave antenna designs have following disadvantages: most broadband millimeter-wave antennas have a large size and are difficult to meet the requirement of wide-angle beam scanning, some antenna with a small plane size can achieve full coverage of the target frequency bands by taking a metal structure as a main radiation body, but the metal ohmic loss in the millimeter-wave frequency bands will increase significantly, which will lead to a rapid reduction in radiation efficiency; compared with the metal antenna, the dielectric resonator antenna without metal ohmic loss has higher radiation efficiency; however, the existing broadband dielectric resonator antenna cannot meet the requirement of small size, while the dielectric resonator antenna that meets the requirement of small size has narrow bandwidth coverage and cannot achieve the full-band coverage of the 5G millimeter-wave bands; in addition, most of the existing dielectric resonator antennas use separately processed ceramic dielectrics as the radiation body, which makes the processing and assembly of the existing dielectric resonator antennas be complex.

SUMMARY

In order to solve the problems in the prior art, a purpose of the disclosure is to provide a millimeter-wave broadband substrate integrated hybrid dielectric resonator antenna (also referred to as a hybrid antenna in the disclosure) which has a triple-resonator hybrid structure of substrate integrated dielectric resonator-slot-metal ring patch, and can provide four operating modes to realize the work of broadband. The technical solution of the hybrid antenna has the advantage of high efficiency of the dielectric resonator (i.e., the substrate integrated dielectric resonator in the disclosure), and the hybrid antenna have a compact structure and a small plane size, and can meet the requirements of wide-angle beam scanning of an antenna array. The hybrid antenna also supports the full coverage of target millimeter-wave frequency bands, and integrates processing and forming, which makes processing and assembling of the hybrid antenna extremely convenient.

In order to achieve the above purpose, the disclosure provides following technical solutions: a millimeter-wave broadband substrate integrated hybrid dielectric resonator antenna, including:

- a first dielectric substrate with high dielectric constant, a second dielectric substrate with low dielectric constant, and a third dielectric substrate with low dielectric constant sequentially stacked from top to bottom;
- wherein the first dielectric substrate and the second dielectric substrate are adhered by a first adhesive sheet, the second dielectric substrate and the third dielectric substrate are adhered by a second adhesive sheet, a middle of a top surface of the second dielectric substrate is printed with a metal ring patch, a top surface of the third dielectric substrate is formed with a metal ground plane, the metal ground plane is etched with a feed slot, and a bottom surface of the third dielectric substrate is disposed with a microstrip line; and
- wherein the first dielectric substrate and the second dielectric substrate cooperatively form a dielectric resonator configured to provide a first resonant mode and a fourth resonant mode, the feed slot serves as a slot resonator configured to provide a second resonant mode, and the metal ring patch serves as a metal ring patch resonator configured to provide a third resonant mode.

In an embodiment, the second dielectric substrate and the third dielectric substrate each are square, and a plane size of the second dielectric substrate and a plane size of the third dielectric substrate each are 12 millimeters (mm)×12 mm, and a height of the second dielectric substrate is equal to a height of the third dielectric substrate.

In an embodiment, the feed slot is H-shaped, a middle slot of the feed slot is orthogonal to the microstrip line, a length of the middle slot of the feed slot is 1.7 mm, and lengths of two side slots of the feed slot each are 0.4 mm.

In an embodiment, a shape of the metal ring patch is a square ring, an outer square size of the square ring is 1 mm×1 mm, an inner square size of the square ring is 0.7 mm×0.7 mm, and a plane size of the first dielectric substrate is larger than a plane size of the metal ring patch.

In an embodiment, operating frequencies of the first resonant mode, the second resonant mode, the third resonant mode and the fourth resonant mode are different from one another and sequentially increased in that order.

In an embodiment, the first dielectric substrate is square, a plane size of the first dielectric substrate is smaller than each of a plane size of the second dielectric substrate and a plane size of the third dielectric substrate, and a height of the first dielectric substrate is greater than each of a height of the second dielectric substrate and a height of the third dielectric substrate.

In an embodiment, a height of the first adhesive sheet and a height of the second adhesive sheet are the same, and a plane size of the first adhesive sheet is smaller than a plane size of the second adhesive sheet.

In an embodiment, the hybrid antenna is formed through integrated processing by printed circuit board (PCB) technology.

The disclosure has the following technical effects.

The triple-resonator hybrid structure of substrate integrated dielectric resonator-slot-metal ring patch is provided in the disclosure and is an effective technical solution for the terminal millimeter-wave antenna. Firstly, a dielectric resonator is used as a radiation body in the disclosure, the dielectric resonator has higher radiation efficiency than a metal antenna and can effectively solve the problem of low radiation efficiency of the metal antenna. Secondly, the triple-resonator hybrid structure disclosed in the disclosure can provide four operating modes in a range of 24~45 GHz, and the four operating modes are obtained by following ways: a basic mode ($TE_{111}$) at 25 GHz and a higher-order mode ($TE_{131}$) at 43 GHz of the substrate integrated dielectric resonator are excited by slot-feeding; the feed slot itself as a resonator provides a resonant mode at 33 GHZ; and a square metal ring patch is printed between the dielectric substrate with high dielectric constant and the dielectric substrate with low dielectric constant, thus a metal ring patch resonator structure is obtained, and the metal ring patch resonator structure provides a resonant mode at 38 GHz. By combining the above four resonant modes, the problem of narrow bandwidth coverage in a dielectric resonator antenna with a small size is solved. Then, the resonator hybrid technology disclosed in the disclosure does not need to increase the plane size of the antenna, so the antenna can have a relatively compact structure, and the plane size of the antenna is $0.4\lambda_0 \times 0.4\lambda_0$ ($\sim\lambda_0$@30 GHZ). Multiple hybrid antennas of disclosure can be easily combined to obtain a wide-angle beam scanning antenna array. Finally, the disclosure can be formed through integrated processing by PCB technology, which is extremely convenient for processing and assembling.

BRIEF DESCRIPTION OF DRA WINGS

In order to explain the embodiments of the disclosure or the technical solutions in the prior art more clearly, the following will briefly introduce the attached drawings used in the embodiments. It is apparent that the attached drawings in the following description are only a part of embodiments of the disclosure. For those ordinary skilled in the art, other attached drawings obtained from the attached drawings without paying creative work should belong to the scope of protection of the disclosure.

DESCRIPTION OF REFERENCE NUMERALS

Figure 1:
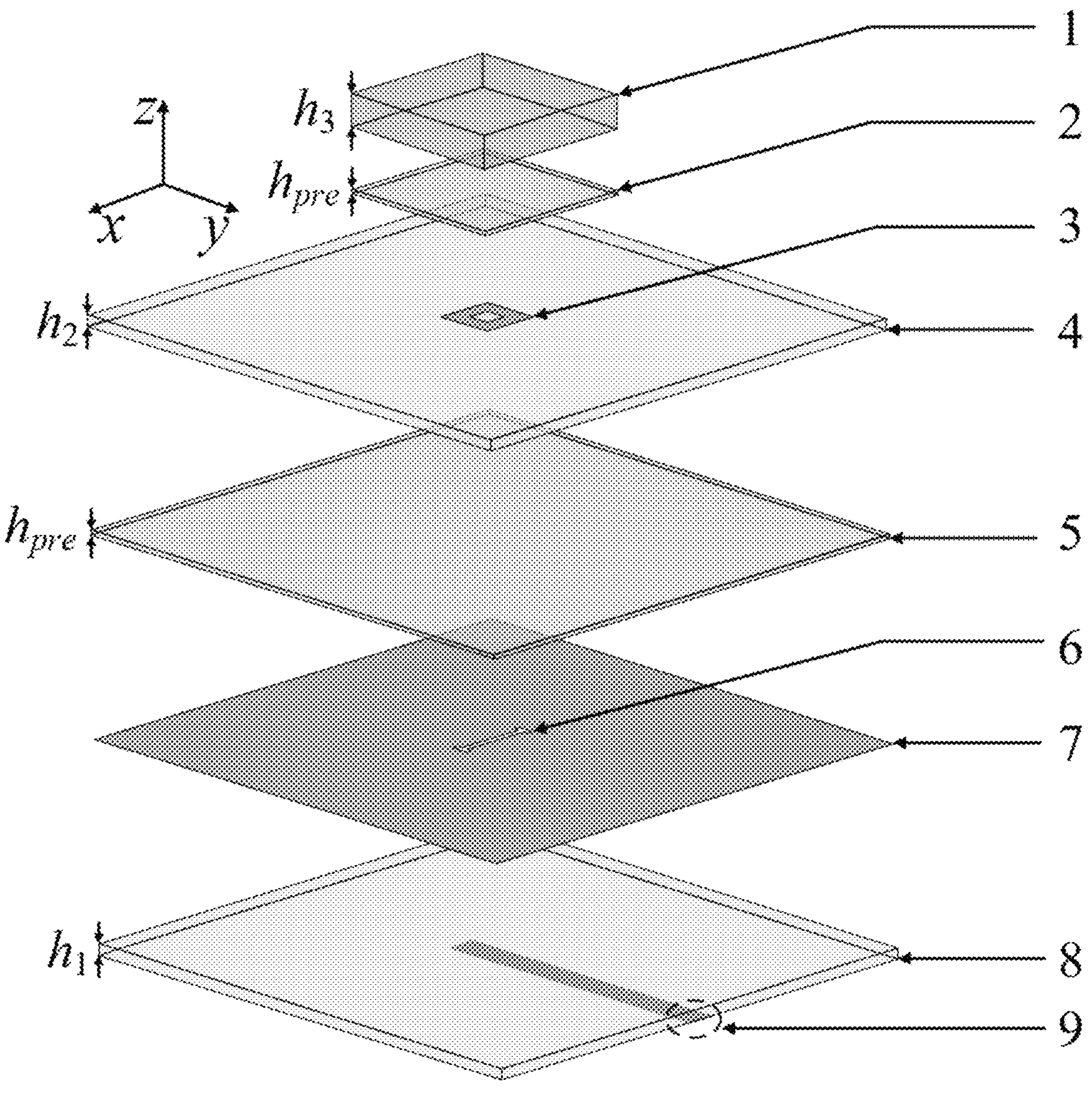
FIG. 1 is a structural schematic diagram of an antenna according to an embodiment of the disclosure.

1—first dielectric substrate; 2—first adhesive sheet; 3—metal ring patch; 4—second dielectric substrate; 5—second adhesive sheet; 6—feed slot; 7—metal ground plane; 8—third dielectric substrate; 9—microstrip line.

DETAILED DESCRIPTION OF EMBODIMENTS

The following will give a clear and complete description of the technical solution in the embodiments of the disclosure in combination with the attached drawings in the embodiments of the disclosure. Apparently, the described embodiments are only a part of the embodiments of the disclosure, not all of them. Based on the embodiments of disclosure, all other embodiments obtained by those ordinary skilled in the art without creative work should fall within the scope of protection of the disclosure.

For the problems in the prior art, a hybrid antenna based on a substrate integrated dielectric resonator disclosed by the disclosure is an effective technical solution to realize a terminal millimeter-wave broadband antenna. The disclosure uses dielectric substrates to obtain a dielectric resonator as a radiation body, and combines the dielectric resonator, a feed slot resonator, and a metal ring patch resonator to obtain a triple-resonator hybrid structure of substrate integrated dielectric resonator-slot-metal ring patch. The hybrid antenna can provide four operating modes (that is, a basic mode $TE_{111}$ and a higher-order mode $TE_{131}$ of the dielectric resonator, a slot mode, and a metal ring patch mode) to realize the work of broadband. The technical solution of the hybrid antenna has the advantage of high efficiency of the dielectric resonator, and the hybrid antenna have a compact structure and a small plane size, and can meet the requirements of wide-angle beam scanning of an antenna array. The hybrid antenna also supports the full coverage of target millimeter-wave frequency bands, and integrates processing and forming, which makes processing and assembling extremely convenient. Therefore, the hybrid antenna of the disclosure is an effective solution for the terminal millimeter-wave antenna.

The hybrid antenna of the disclosure includes a first dielectric substrate 1 with high dielectric constant, a second dielectric substrate 4 with low dielectric constant, and a third dielectric substrate 8 with low dielectric constant sequentially stacked from top to bottom. Specifically, the first dielectric substrate 1 and the second dielectric substrate 4 are adhered by a first adhesive sheet 2, the second dielectric substrate 4 and the third dielectric substrate 8 are adhered by a second adhesive sheet 5, a middle of a top surface of the second dielectric substrate 4 is printed with a metal ring patch 3, a top surface of the third dielectric substrate 8 is formed with a metal ground plane 7, the metal ground plane 7 is etched with a feed slot 6, and a bottom surface of the third dielectric substrate 8 is provided with a microstrip line 9. The first dielectric substrate 1 and the second dielectric substrate 4 cooperatively form a dielectric resonator configured to provide a first resonant mode and a fourth resonant mode, the feed slot 6 serves as a slot resonator configured to provide a second resonant mode, and the metal ring patch 3 serves as a metal ring patch resonator configured to provide a third resonant mode.

In an embodiment, the second dielectric substrate 4 and the third dielectric substrate 8 each are square. A plane size of the second dielectric substrate 4 and a plane size of the third dielectric substrate 8 each are 12 millimeters (mm)×12 mm, and a height of the second dielectric substrate 4 is equal to a height of the third dielectric substrate 8. In an embodiment, the feed slot 6 is H-shaped and a middle slot of the feed slot 6 is orthogonal to the microstrip line 9, a length of the middle slot of the feed slot 6 is 1.7 mm, and lengths of two side slots of the feed slot 6 each are 0.4 mm. In an embodiment, a shape of the metal ring patch 3 is a square ring, an outer square size of the square ring is 1 mm×1 mm, an inner square size of the square ring is 0.7 mm×0.7 mm, and a plane size of the first dielectric substrate 1 is larger than a plane size of the metal ring patch 3. In an embodiment, operating frequencies of the first resonant mode, the second resonant mode, the third resonant mode and the fourth resonant mode are different from one another and sequentially increased in that order. In an embodiment, the first dielectric substrate 1 is square, a plane size of the first dielectric substrate 1 is smaller than each of a plane size of the second dielectric substrate 4 and a plane size of the third dielectric substrate 8, and a height of the first dielectric substrate 1 is greater than each of a height of the second dielectric substrate 4 and a height of the third dielectric substrate 8. In an embodiment, a height of the first adhesive sheet 2 and a height of the second adhesive sheet 5 are the same, and a plane size of the first adhesive sheet 2 is smaller than a plane size of the second adhesive sheet 5. In an embodiment, the hybrid antenna is integrally formed through integrated processing by PCB technology.

For the feed slot 6, in the technical field of antennas, the slot itself is an antenna, that is, slot antenna. When there are other radiation structures above the slot, the slot can also be used as a classical coupling structure to provide coupling feed to other radiation structures. To realize the dual function of the slot, it is necessary to adjust the length and width of the slot carefully. The length of the slot determines its resonant frequency as a resonator, and the width of the slot determines its coupling strength as a coupling feed structure.

For the metal ring patch 3, the resonant frequency of the metal ring patch 3 is determined by the sum of the two side lengths of the ring, while the resonant frequency of a square patch is determined by one side length. Therefore, the metal ring patch 3 has a smaller plane size than the square patch at the same resonant frequency. The metal ring patch 3 used as a patch resonator is directly placed above the feed slot 6. If the plane size of the metal ring patch 3 is large, the metal ring patch 3 will have a significant shielding effect on the feed slot 6 and affect the feed of the feed slot 6 to the antenna, thereby affecting the performance of the antenna. The plane size of the metal ring patch 3 is small, so that the metal ring patch 3 added into the antenna as a resonator will not affect operations of other resonators.

The dielectric resonator is a three-dimensional resonant structure, and its resonant frequency is determined by its dielectric constant, three-dimensional size and other parameters. The first dielectric substrate 1 is a main body of the dielectric resonator. Selecting a plate with high dielectric constant can make the size of the antenna smaller. The selection of the dielectric constant and size is determined by considering available plate types and resonant frequencies thereof. The second dielectric substrate 4 is disposed between the feed slot 6 and the first dielectric substrate 1, the second dielectric substrate 4 is a part of the dielectric resonator, and the second dielectric substrate 4 must be a plate with low dielectric constant, mainly to improve the impedance matching of the antenna. Since a resonator with high dielectric constant has a high quality factor, and there will be problems of narrow band width and difficult matching when the resonator with the high dielectric constant is directly excited. A plate with low dielectric constant disposed between the feed slot 6 and the first dielectric substrate 1 can plays a good role in buffering (that is, impedance matching). The third dielectric substrate 8 is a feed plate, and a thin plate with low dielectric constant is selected as the feed plate to reduce the feed loss and keep a compact height of the hybrid antenna.

Figure 2:
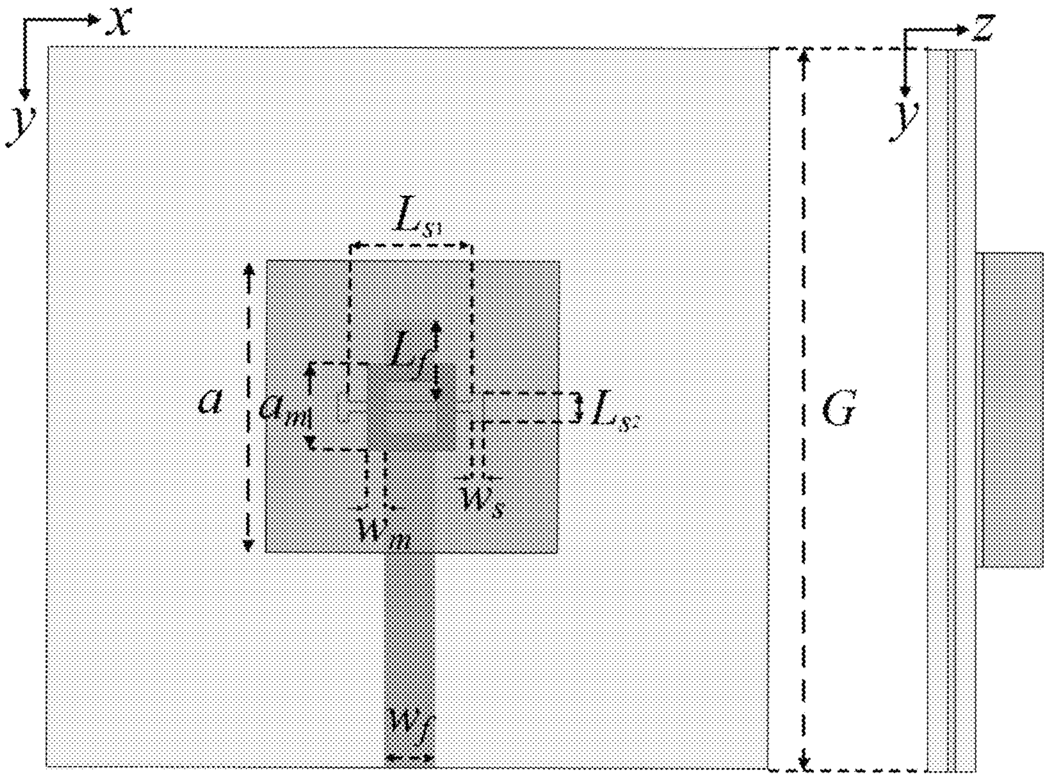
FIG. 2 is a structural schematic diagram of a metal ring patch according to an embodiment of the disclosure.

The above technical solutions are described as follows according to relevant data. The disclosure provides a millimeter-wave broadband substrate integrated hybrid dielectric resonator antenna, the structures of the hybrid antenna as shown in FIG. 1 and FIG. 2 includes: the first dielectric substrate 1 with the high dielectric constant (dielectric constant $\varepsilon_r$>6) and the second dielectric substrate 4 with the low dielectric constant (dielectric constant $\varepsilon_r$<4) disposed from top to bottom in turn, the metal ring patch 3 printed on the top surface of the second dielectric substrate 4, the first adhesive sheet 2 configured to adhere the first dielectric substrate 1 and the second dielectric substrate 4, the third dielectric substrate 8 with the low dielectric constant (dielectric constant $\varepsilon_r$<4), the second adhesive sheet 5 configured to adhere the second dielectric substrate 4 and the third dielectric substrate 8, the metal ground plane 7 disposed on the top surface of the third dielectric substrate 8 and etched with the H-shaped feed slot 6, and the microstrip line 9 disposed on the third dielectric substrate 8 and configured for port-feed. The hybrid antenna of the disclosure can achieve full coverage of the 5G millimeter-wave target frequency bands and has the excellent characteristic of small size, and can be easily combined to obtain an antenna array, which has great practical value.

Based on the structures in the FIG. 1 and FIG. 2, parameters of the structures are shown in TABLE 1.

TABLE 1

| Parameter | a | $a_m$ | G | $L_f$ | $L_{s1}$ | $L_{s2}$ | $w_m$ |
|---|---|---|---|---|---|---|---|
| Size (mm) | 4 | 1 | 12 | 1.125 | 1.7 | 0.4 | 0.3 |
| Parameter | $w_f$ | $w_s$ | $h_1$ | $h_2$ | $h_3$ | $h_{pre}$ | — |
| Size (mm) | 0.7 | 0.15 | 0.254 | 0.254 | 0.762 | 0.1 | — |

The above describe a triple-resonator hybrid structure of the substrate integrated dielectric resonator-slot-metal ring patch provided by the disclosure. The first dielectric substrate 1 with the high dielectric constant on the top and the second dielectric substrate 4 with the low dielectric constant cooperatively form a laminated dielectric resonator. The radio frequency (RF) excitation signal is fed by the microstrip line 9 provided on the third dielectric substrate 8, and the feed slot 6 performs coupling feed on other structures above the feed slot 6. The basic mode ($TE_{111}$) and higher-order mode ($TE_{131}$) of the laminated dielectric resonator are excited by the feed slot 6, and the first resonant mode and the fourth resonant mode operate at 25 GHz and 43 GHz respectively. The feed slot 6 is not only a part of a feed structure of hybrid antenna, but also participates in the radiation as a slot resonator to provide the second resonant mode, namely the slot mode, providing a resonant point operating at 33 GHz. The metal ring patch 3 disposed on the top surface of the second dielectric substrate 4 serves as a metal ring patch resonator and is excited by the feed slot 6 to provide the third resonant mode, namely the metal ring patch mode which can provide another resonant point operating at 38 GHz. Therefore, there are four resonant modes in the range of 24 GHz~45 GHz, so as to achieve the full coverage of 5G millimeter-wave bands.

The key point of the disclosure is to obtain 24 GHZ~45 GHz impedance bandwidth and achieve full coverage of the 5G millimeter-wave bands through the feed slot 6 exciting the substrate integrated dielectric resonator. The hybrid antenna of the disclosure does not need to increase the plane size of the antenna, so that the antenna structure of the hybrid antenna is compact and can be realized with a small plane size, and the plane size of the hybrid antenna is $0.4\lambda_0 \times 0.4\lambda_0$ ($\sim\lambda_0$@30 GHZ) in an embodiment, with this small size, the hybrid antenna of the disclosure can be conveniently combined to obtain an antenna array. The disclosure realizes the structure of the substrate integrated dielectric resonator in the way of substrate integration which is more convenient in processing and assembling compared with the ceramic dielectric resonator.

The disclosure provides the triple-resonator hybrid structure of substrate integrated dielectric resonator-slot-metal ring patch, and the triple-resonator hybrid structure can excite four operating modes including: the basic mode ($TE_{111}$) and the higher-order mode ($TE_{131}$) of the substrate integrated dielectric resonator, the slot mode, and the metal ring patch mode. The triple-resonator hybrid structure has the advantage of high efficiency of the dielectric resonator, and also has the advantage of broadband coverage and small size. The hybrid antenna of the disclosure can cover all 5G millimeter-wave bands authorized worldwide, but not limited to these wave bands. The hybrid antenna of the disclosure can also cover other 5G millimeter-wave bands.

The above technical solution will be described in detail below.

Figure 3:
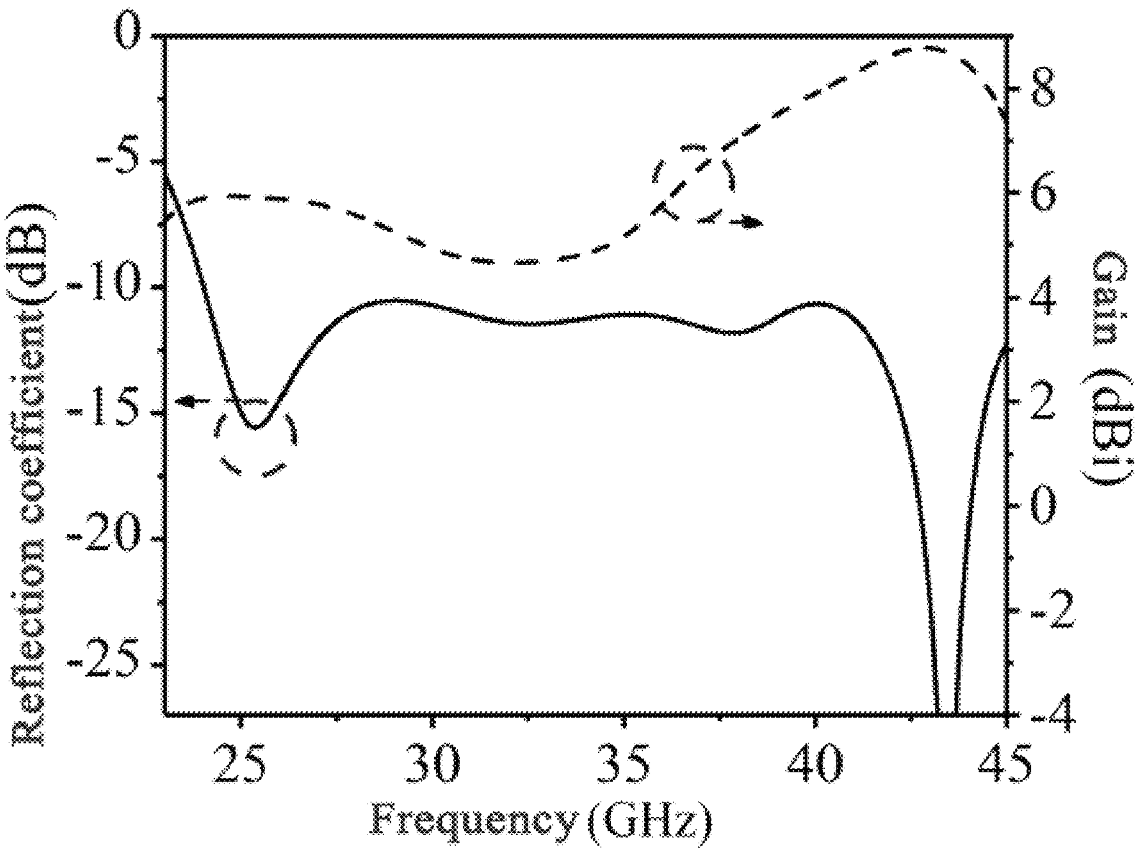
FIG. 3 is a schematic diagram of a simulation result of $|S_{11}|$ and gain of the antenna according to an embodiment of the disclosure.
Figure 4:
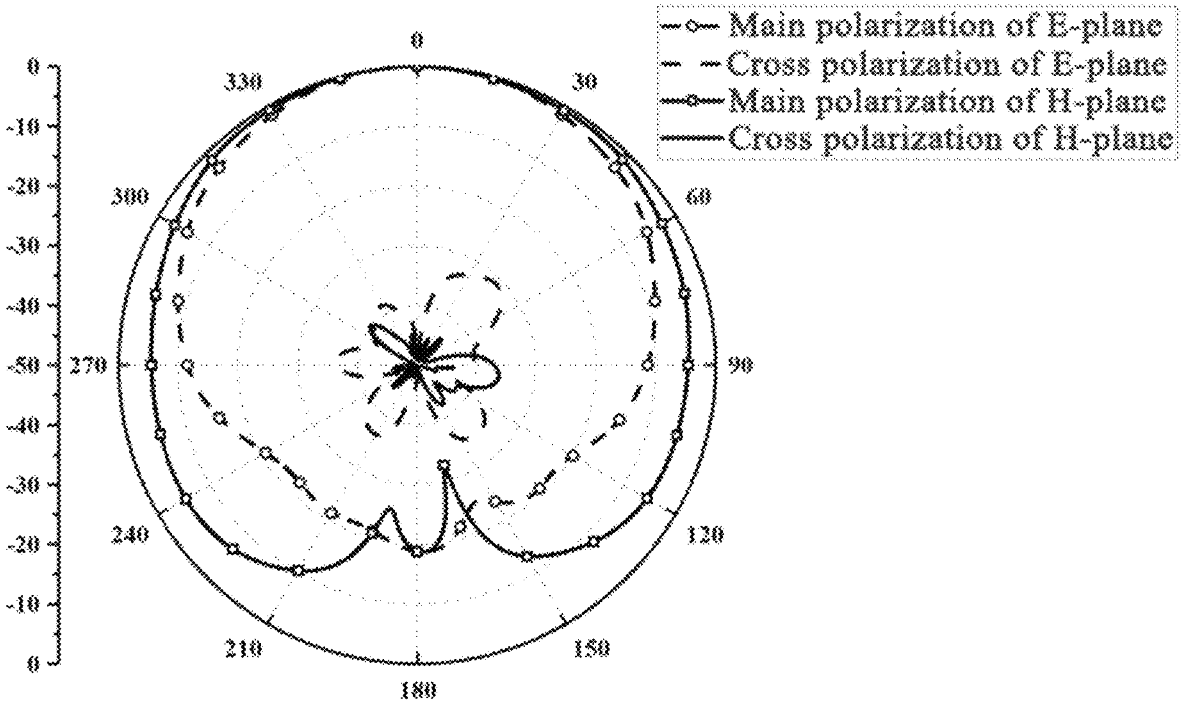
FIG. 4 is a schematic simulated radiation pattern of the antenna at 28 GHZ according to an embodiment of the disclosure.
Figure 5:
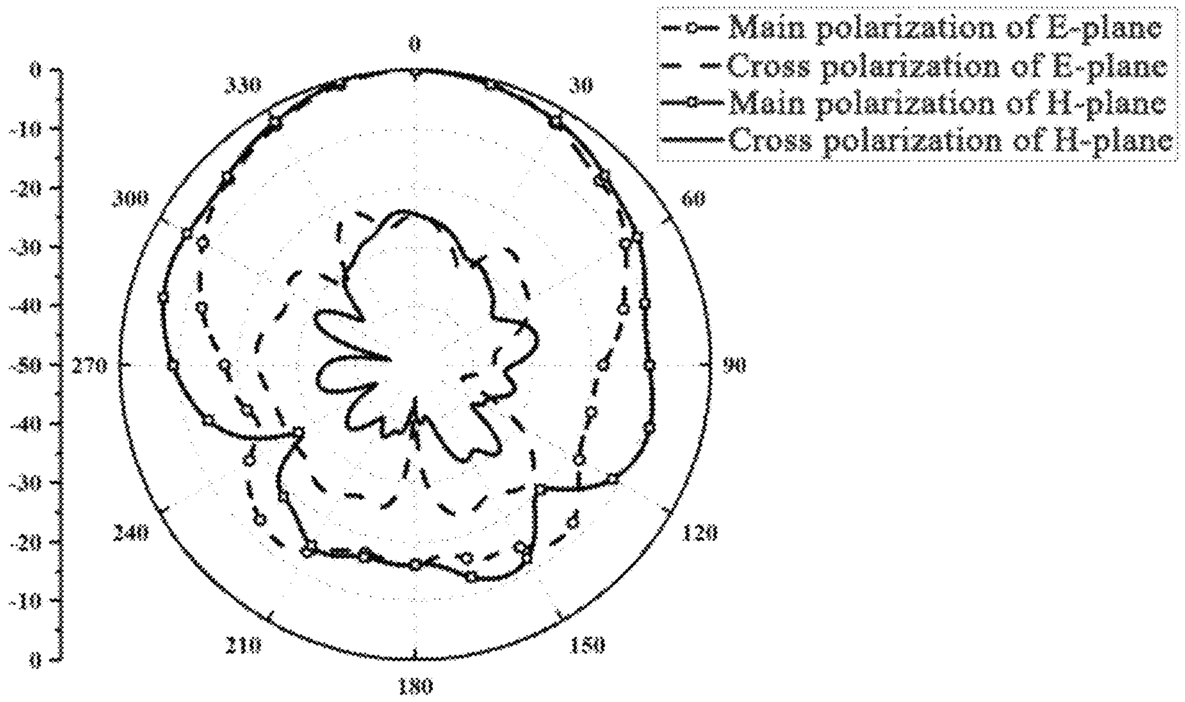
FIG. 5 is a schematic simulated radiation pattern of the antenna at 39 GHZ according to an embodiment of the disclosure.

The disclosure provides the millimeter-wave broadband substrate integrated hybrid dielectric resonator antenna which has the triple-resonator hybrid structure of substrate integrated dielectric resonator-slot-metal ring patch, a simulation software used in the disclosure is high frequency structure simulator (HFSS), the antenna structure of hybrid antenna of the disclosure is shown in FIG. 1. In an embodiment of the disclosure, both dielectric constants of the second dielectric substrate 4 and third dielectric substrate 8 are 3.5, and both loss angles of the second dielectric substrate 4 and third dielectric substrate 8 are 0.0018. The dielectric constant of the first dielectric substrate 1 is 10.2, the loss angle of the first dielectric substrate 1 is 0.0025, and the thickness of the first dielectric substrate 1 is 0.762 mm. An overall section height of the antenna structure 1.47 mm ($\sim 0.14\lambda_0$@ 30 GHZ), and the plane size of the antenna structure is $0.40\lambda_0 \times 0.4\lambda_0$ (~)@ 30 GHZ). The transmission response and radiation response of the hybrid antenna are shown in FIG. 3. Taking $|S11| \leq -10$ decibels (dB) as a standard, a bandwidth range of the hybrid antenna obtained is greater than a range of 24 GHZ~45 GHZ (relative bandwidth >36.84%). It can be seen that the four 5G millimeter-wave bands of n257, n258, n260 and n261 are well covered, and the full coverage of the 5G millimeter-wave bands are achieved. In the four 5G millimeter-wave bands, the gain generated by the hybrid antenna after excitation is greater than 5 decibels isotropic (dBi). FIG. 4 and FIG. 5 illustrate simulated radiation patterns at 28 GHz and 39 GHz respectively. Both the main polarization of the E-plane and the main polarization of the H-plane are nearly symmetrical, and the cross polarization of the hybrid antenna is greater than 15 dB in a bandwidth range of 3-dB.

Figure 6:
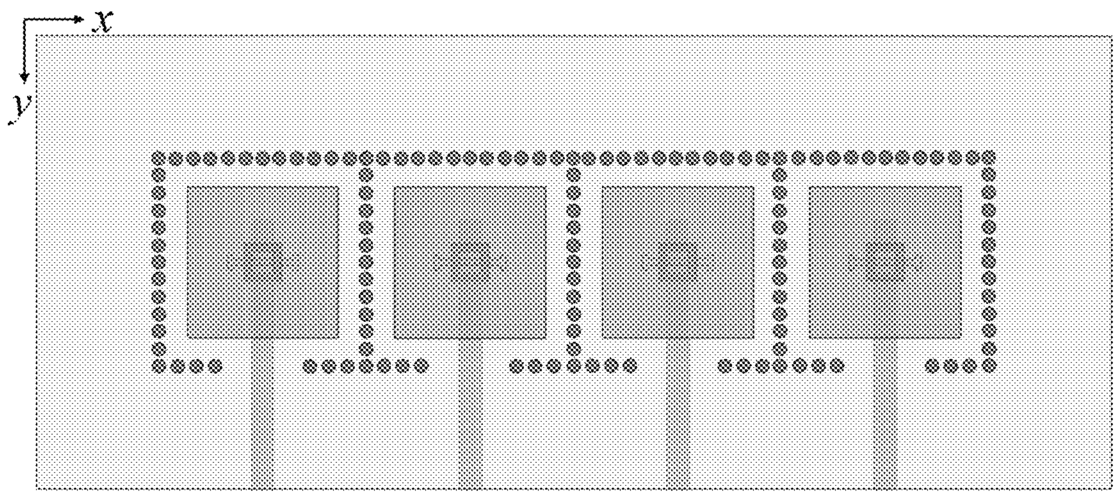
FIG. 6 is a schematic diagram of a 1×4 antenna array according to an embodiment of the disclosure.
Figure 7:
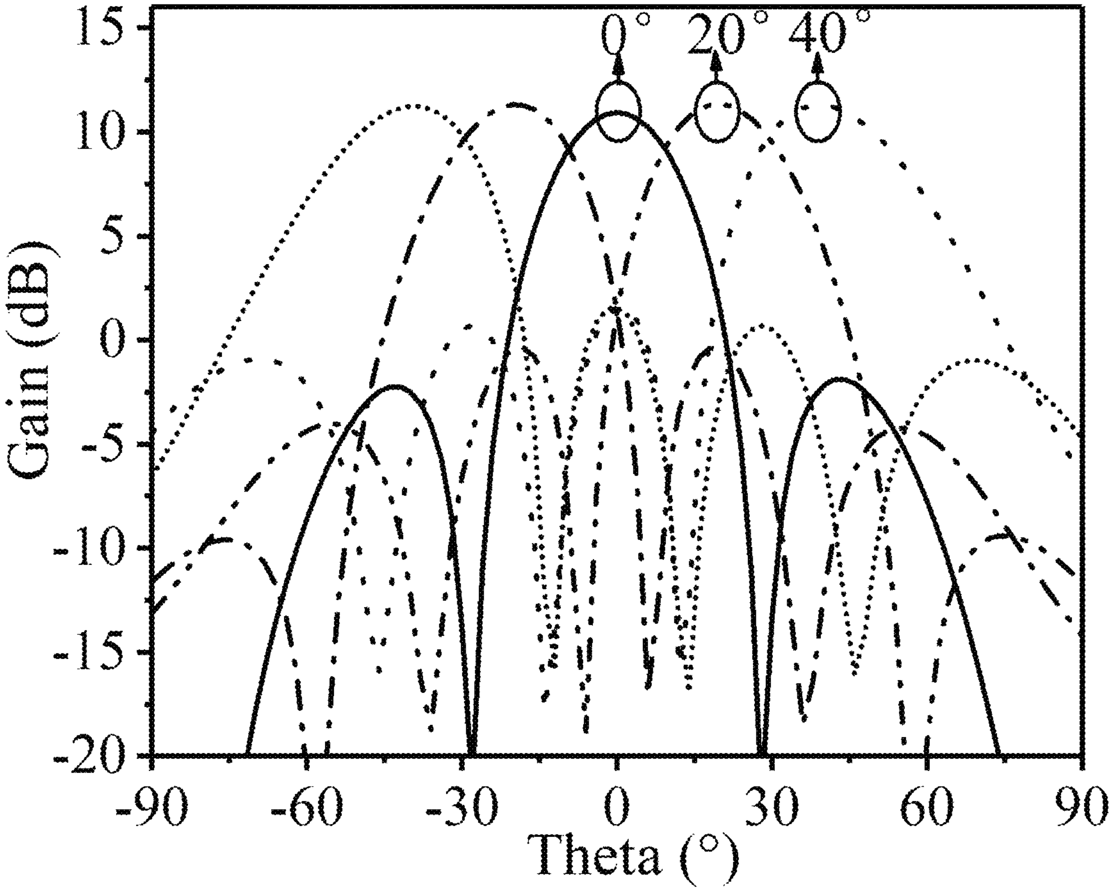
FIG. 7 is a schematic diagram of a scanning result of the 1×4 antenna array at 28 GHz according to an embodiment of the disclosure.
Figure 8:
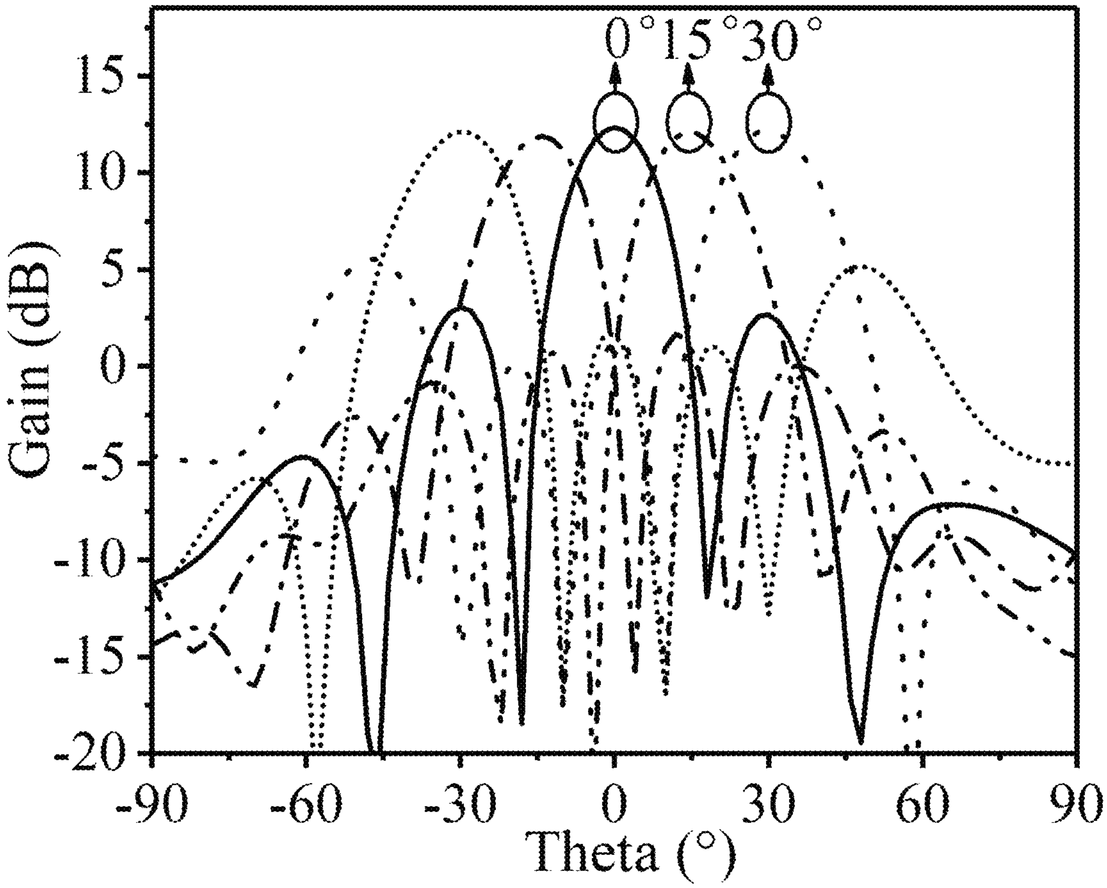
FIG. 8 is a schematic diagram of a scanning result of the 1×4 antenna array at 39 GHz according to an embodiment of the disclosure.

In order to test the wide-angle beam scanning performance of the hybrid antenna, hybrid antenna elements are combined to obtain a 1×4 antenna array. The antenna array is simulated and a schematic diagram of the antenna array is shown in FIG. 6. An element spacing of the antenna array is 5.5 mm. In order to reduce mutual coupling among the hybrid antenna elements, metal through-holes are printed around the hybrid antenna elements. The beam scanning results of the antenna array at 28 GHz and 39 GHz are shown in FIG. 7 and FIG. 8 respectively, the scanning angle of the antenna array at 28 GHz is more than 45°, and the scanning angle of the antenna array at 39 GHz is more than 30°. It can be seen that the hybrid antenna of the disclosure has good wide-angle beam scanning ability to achieve wide-angle coverage after being combined into the antenna array.

The triple-resonator hybrid structure of substrate integrated dielectric resonator-slot-metal ring patch as provided in the disclosure is an effective technical solution for the terminal millimeter-wave antenna. Firstly, a dielectric resonator is used as a radiation body in the disclosure, the dielectric resonator has higher radiation efficiency than a metal antenna and can effectively solve the problem of low radiation efficiency of the metal antenna. Secondly, the triple-resonator hybrid structure disclosed in the disclosure can provide four operating modes in a range of 24~45 GHZ, and the four operating modes are obtained by following ways: a basic mode ($TE_{111}$) at 25 GHz and a higher-order mode ($TE_{131}$) at 43 GHz of the substrate integrated dielectric resonator are excited by slot-feeding; the feed slot 6 itself as a resonator provides a resonant mode at 33 GHZ; and a square metal ring patch is printed between the dielectric substrate with high dielectric constant and the dielectric substrate with low dielectric constant, thus a metal ring patch resonator structure is obtained, and the metal ring patch resonator structure provides a resonant mode at 38

GHz. By combining the above four resonant modes, the problem of narrow bandwidth coverage in the small size dielectric resonator antennas is solved. Then, the resonator hybrid technology disclosed in the disclosure does not need to increase the plane size of the antenna, so the antenna can have a relatively compact structure, and the plane size of the antenna is $0.4\lambda_0 \times 0.42\lambda_0$ ($-\lambda_0$@30 GHZ). Multiple hybrid antennas of disclosure can be easily combined to obtain a wide-angle beam scanning antenna array. Finally, the disclosure can be formed through integrated processing by PCB technology, which is extremely convenient for processing and assembling.

The basic principle, main features and advantages of the disclosure are described above. Those skilled in the art should understand that the disclosure is not limited by the above embodiments. The above embodiments in the specification only describe the principle of the disclosure. Without departing from the spirit and scope of the disclosure, there will be various changes and improvements in the disclosure. These changes and improvements should fall within the scope of protection of the disclosure. The scope of protection claimed by the disclosure is defined by the appended claims and the equivalents thereof.

What is claimed is:

1. A millimeter-wave broadband substrate integrated hybrid dielectric resonator antenna, comprising:

a first dielectric substrate with high dielectric constant, a second dielectric substrate with low dielectric constant, and a third dielectric substrate with low dielectric constant sequentially stacked from top to bottom;

wherein the first dielectric substrate and the second dielectric substrate are adhered by a first adhesive sheet, the second dielectric substrate and the third dielectric substrate are adhered by a second adhesive sheet, a middle of a top surface of the second dielectric substrate is printed with a metal ring patch, a top surface of the third dielectric substrate is formed with a metal ground plane, the metal ground plane is etched with a feed slot, and a bottom surface of the third dielectric substrate is disposed with a microstrip line; and wherein the first dielectric substrate and the second dielectric substrate cooperatively form a dielectric resonator configured to provide a first resonant mode and a fourth resonant mode, the feed slot serves as a slot resonator configured to provide a second resonant mode, and the metal ring patch serves as a metal ring patch resonator configured to provide a third resonant mode.

2. The millimeter-wave broadband substrate integrated hybrid dielectric resonator antenna according to claim 1, wherein the second dielectric substrate and the third dielectric substrate each are square, and a plane size of the second dielectric substrate and a plane size of the third dielectric substrate each are 12 millimeters (mm)×12 mm, and a height of the second dielectric substrate is equal to a height of the third dielectric substrate.

3. The millimeter-wave broadband substrate integrated hybrid dielectric resonator antenna according to claim 1, wherein the feed slot is H-shaped, a middle slot of the feed slot is orthogonal to the microstrip line, a length of the middle slot of the feed slot is 1.7 mm, and lengths of two side slots of the feed slot each are 0.4 mm.

4. The millimeter-wave broadband substrate integrated hybrid dielectric resonator antenna according to claim 1, wherein a shape of the metal ring patch is a square ring, an outer square size of the square ring is 1 mm×1 mm, an inner square size of the square ring is 0.7 mm×0.7 mm, and a plane size of the first dielectric substrate is larger than a plane size of the metal ring patch.

5. The millimeter-wave broadband substrate integrated hybrid dielectric resonator antenna according to claim 1, wherein operating frequencies of the first resonant mode, the second resonant mode, the third resonant mode and the fourth resonant mode are different from one another and sequentially increased in that order.

6. The millimeter-wave broadband substrate integrated hybrid dielectric resonator antenna according to claim 1, wherein the first dielectric substrate is square, a plane size of the first dielectric substrate is smaller than each of a plane size of the second dielectric substrate and a plane size of the third dielectric substrate, and a height of the first dielectric substrate is greater than each of a height of the second dielectric substrate and a height of the third dielectric substrate.

7. The millimeter-wave broadband substrate integrated hybrid dielectric resonator antenna according to claim 1, wherein a height of the first adhesive sheet and a height of the second adhesive sheet are the same, and a plane size of the first adhesive sheet is smaller than a plane size of the second adhesive sheet.

8. The millimeter-wave broadband substrate integrated hybrid dielectric resonator antenna according to claim 1, wherein the antenna is formed through integrated processing by printed circuit board (PCB) technology.

* * * * *